Figure 1:
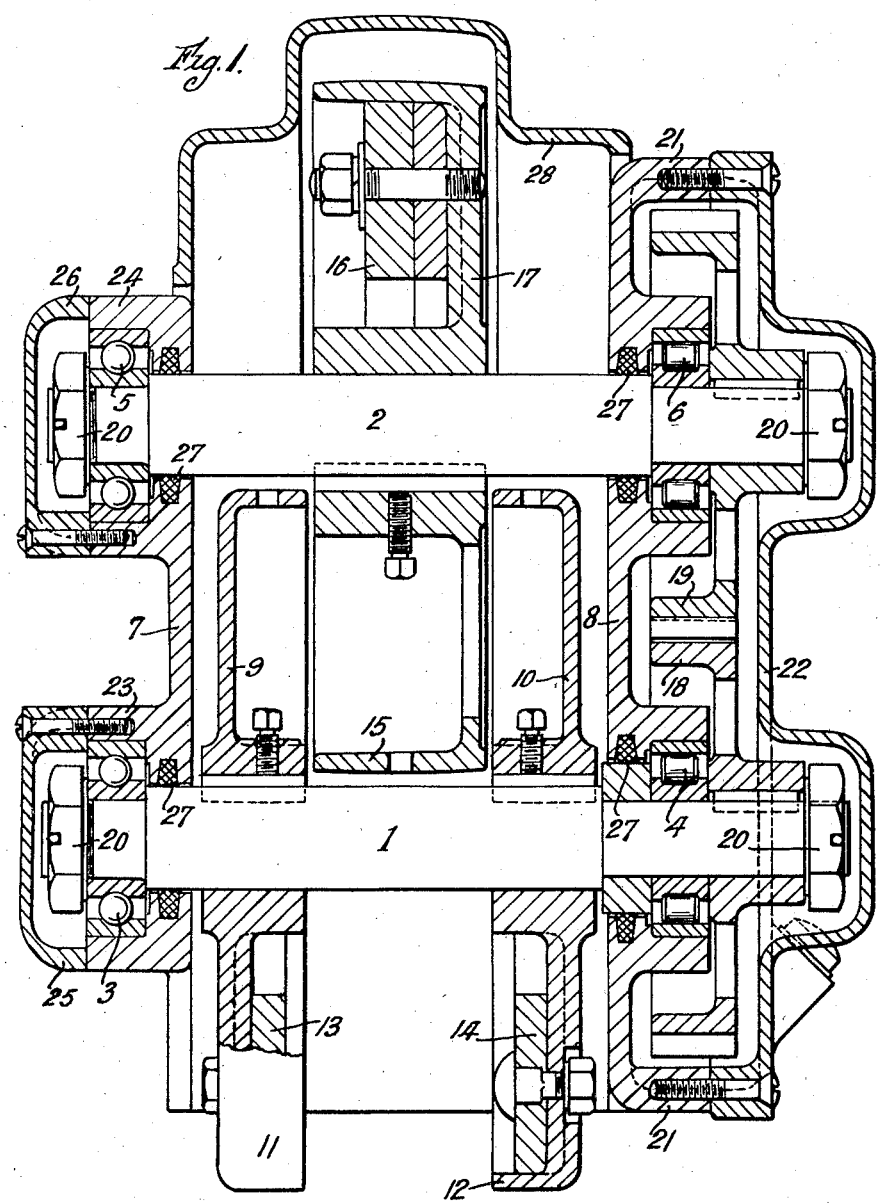

Oct. 1, 1935. T. W. HALL ET AL 2,016,006
SHAKING MECHANISM
Filed March 28, 1935 2 Sheets-Sheet 1

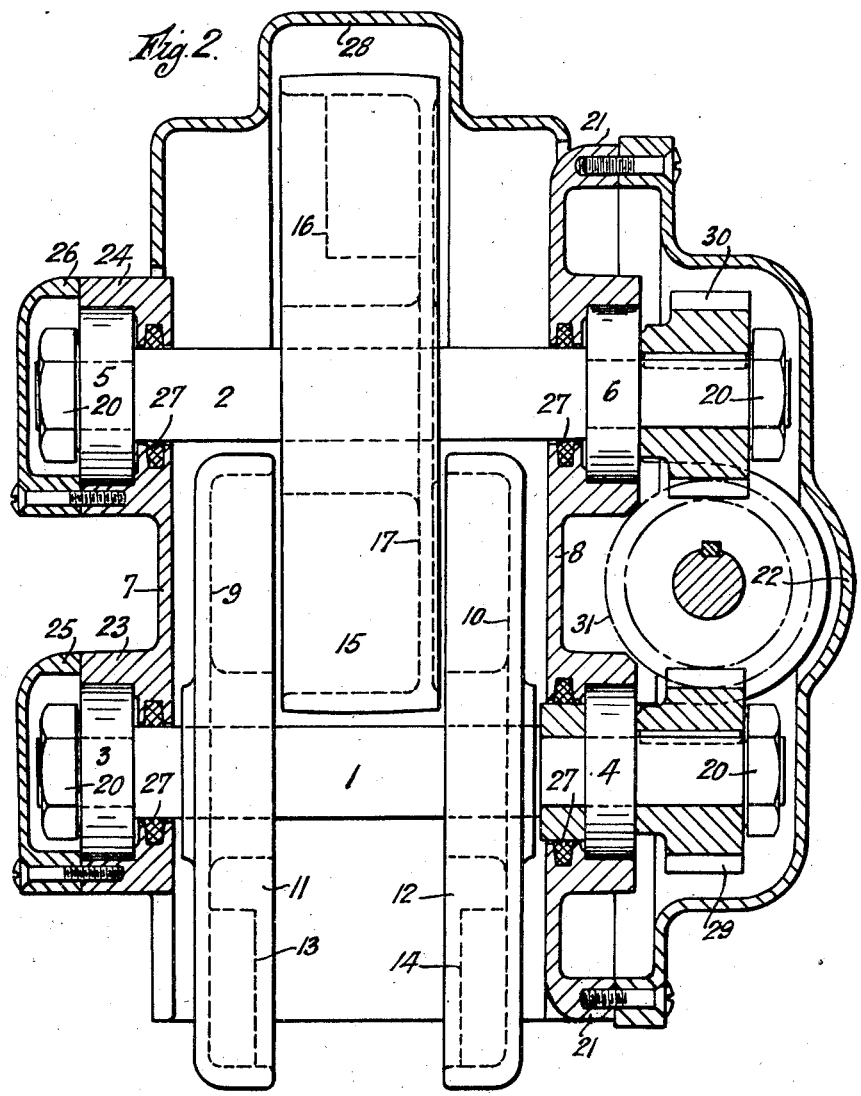

Patented Oct. 1, 1935

2,016,006

UNITED STATES PATENT OFFICE 2,016,006

SHAKING MECHANISM

Thomas Watson Hall and Arthur Leggett, Ipswich, England, assignors to E. R. & F. Turner Limited, Ipswich, England Application March 28, 1935, Serial No. 13,521
In Great Britain March 27, 1934

6 Claims. (Cl. 74—61)

This invention relates to improvements in shaking mechanism, i. e. mechanism such as is employed for vibratory sieves or screens and the like and is concerned with mechanism of the kind employing rotatable weights which are eccentric with respect to their axes of rotation.

The invention is illustrated in the accompanying drawings in which Figure 1 is a vertical sectional elevation of one form of construction, and Figure 2 a similar view of a modified form of construction.

Referring firstly to Figure 1 there are provided two parallel shafts 1, 2 mounted respectively in two spaced ball or roller anti-friction bearings 3, 4, and 5, 6 carried by two end plates 7, 8 rising from a base plate adapted to be secured to the device to be vibrated or shaken, the device being freely carried.

On the shaft 1 and between the two bearings 3, 4 thereof are secured two similar discs 9, 10 which have peripheral flanges 11, 12 and have weights 13, 14 secured to the discs within the flanges, the weights 13, 14 of the two discs being equal and similarly positioned, i. e. the two weights have the same radius of gyration and are in coincident angular positions with regard to their shaft 1. These discs are spaced apart so as to leave between their flanges 11, 12 sufficient clearance to receive a pulley 15 secured centrally to the other shaft 2 this pulley being of approximately the same diameter as the flanged discs 9, 10 and the centres of the two shafts being spaced so as to leave only a small clearance between the periphery of the pulley 15 and the disc shaft 1 and between the flanges 11, 12 of the discs 9, 10 and the pulley shaft 2; this pulley has secured within it a weight 16 which is equal to the sum of the two weights 13, 14 secured to the two discs 9, 10 for which purpose the weight 16 is formed by two weights each similar to the weights 13, 14 and secured side by side to the web or disc part 17 of the pulley 15: this weight 16 has the same radius of gyration as that of each of the two weights 13, 14 on the flanged discs. If desired, instead of using the relationship of weights referred to, there may be provided weights of unequal size and having radii of gyration so proportioned as to produce equal centrifugal forces from the unequal weights.

The shafts 1, 2 are extended at one of their ends beyond the bearings 4 and 6 to receive gear wheels 18, 19 the two gear wheels meshing and being of equal diameter so that when the pulley shaft 2 is driven the other shaft 1 is driven with the same velocity but in the opposite direction: the relative angular position of the weights 13, 14 secured to the discs 9, 10 and the weight 16 secured to the pulley 15 is such that when viewed from the ends of the shafts the weights 13, 14 and the weight 16 cross the plane passing through the axes of the two shafts twice per revolution, once between the axes of the two shafts and once on the remote sides of the axes of the shafts.

It will now be seen that the disposition of the weights is such that the centrifugal forces set up tend to produce shaking along a straight line at right angles to the plane containing the axes of the shafts 1, 2, those components of the centrifugal forces due to the two systems of weights which would by themselves produce shaking in other directions cancelling out one another. Moreover, no couple in any plane parallel with the axes of rotation of the weights is set up between the weights: thus limitations as to size which the existence of such a couple would impose do not exist, there being no limit to the size of mechanism which could be made in accordance with the construction described. Furthermore, the shafts 1 and 2, being mounted in bearings at each side of the weights carried respectively by the shafts, are efficiently supported against bending.

The arrangement described also possesses the advantage of enabling efficient lubrication of the bearings 3, 4, 5, and 6 and gears 18, 19 to be obtained: for this purpose, the end plates 7, 8 are bored to receive the shafts 1, 2 and are counterbored from their outer faces to receive the outer races of the anti-friction roller or ball bearings 3, 4, 5, and 6: the inner races of these bearings are clamped to the shafts 1, 2 by nuts 20 screwing on to the shafts, the nuts at the gear ends of the shafts pressing the hubs of the gear wheels 18, 19 against the said inner races and at the other ends of the shafts pressing directly on to the said races.

The end plate 8 at the gear wheel end of the mechanism is provided with a flange 21 which encircles the two gear wheels 18, 19 and secured to the flange is a dished cover plate 22 thus providing a closed chamber for the reception of lubricant for the bearings and gear wheels. The other end plate may be similarly flanged and provided with a single cover plate, but preferably and as shown this end plate is provided with two flanges 23, 24 each encircling one of the two counterbores and two cover plates 25, 26 are provided one secured to each flange, thus providing two chambers for lubricant for each of the bearings 3, 5. To prevent the escape of lubricant through the bores in the end plates there are provided packing members 27 positioned in recesses formed in the bores in the plates 7, 8. A guard plate 28 is secured to the base plate or the end plates to conceal the discs 9, 10 and pulley 15 while leaving a space to permit a driving belt to be taken around the pulley 15.

In the modification shown in Figure 2, instead of gearing the shafts by the two intermeshing gear wheels 18, 19 these gear wheels are replaced by skew gear wheels 29, 30 of smaller diameter, and drive from one skew gear wheel to the other is effected through an intermediate skew gear 31 in mesh with the first two and at right angles thereto the three gear wheels preferably being of the same diameter. The arrangement shown in Figure 2 is otherwise similar to that described with reference to Figure 1.

It will be seen that with the arrangements described the device to be shaken could readily be provided with two or more of the mechanisms to increase the shaking effect, the mechanisms operating in synchronism.

What we claim is:—

1. A shaking mechanism comprising in combination two shafts parallel with one another, two systems of mass supported respectively by the shafts, each system having its centre of gravity eccentric with respect to the axis of the respective shaft, means rotatably supporting the two shafts at each side of the mass supported by the shafts and in a plane at right angles to the direction of shaking movement, and means rotating the two masses at equal angular velocities and in opposite directions, the two masses being constituted by a plurality of spaced elements which sweep in their rotation through circular overlapping zones and the two masses being disposed to provide equal centrifugal forces and zero couple in any plane parallel with the axes of rotation.

2. A shaking mechanism comprising a first shaft, a member carried by the shaft and having its centre of gravity eccentric to the axis of the shaft, bearings supporting the shaft on both sides of the member, a second shaft parallel with the first shaft, two members carried by the second shaft in spaced relation, the centres of gravity of the two members being disposed eccentrically to the axis of the second shaft, bearings supporting the second shaft on each side of the assembly constituted by the two members, means rotating the two shafts at equal velocities and in opposite directions, the centre of gravity and the mass of the first member and of the two spaced members conjointly being arranged to produce equal centrifugal forces and zero couple between the first member and the spaced members in any plane parallel with the axes of rotation, and means so positioning the bearings for the two shafts that the two shafts are contained in a plane at right angles to the direction of shaking movement and the first member in its rotation sweeps through a zone extending between the zones swept by the two spaced members.

3. A shaking mechanism comprising a first shaft, a member carried by the shaft and having its centre of gravity eccentric to the axis of the shaft, bearings supporting the shaft on both sides of the member, a second shaft parallel with the first shaft, two members carried by the second shaft in spaced relation, the centres of gravity of the two members being similarly disposed eccentrically to the axis of the second shaft, bearings supporting the second shaft on both sides of the assembly constituted by the two members, means rotating one of the shafts, means transmitting rotation from the said one shaft to the other shaft which is caused thereby to rotate at equal velocity in the opposite direction to the direction of rotation of the said one shaft, the centres of gravity and the mass of the members being arranged to produce equal centrifugal forces and zero couple between the first member and the second members in any plane parallel with the axes of rotation, and means so positioning the bearings for the two shafts that the shafts are contained in a plane at right angles to the direction of shaking movement and the member carried by the first shaft sweeps through a zone extending between the zones swept by the two members.

4. A mechanism as claimed in claim 2 and in which the driven shaft has a gear wheel in mesh with a similar gear wheel on the other shaft.

5. A mechanism as claimed in claim 2 and in which the driven shaft has a skew gear in mesh with a second skew gear itself in mesh with a third skew gear on the other shaft, the first and third skew gears being similar.

6. A mechanism as claimed in claim 2 and in which there are provided housings for the bearings and transmission means, the housings containing lubricant.

THOMAS WATSON HALL.
ARTHUR LEGGETT.